United States Patent
Xiang et al.

(10) Patent No.: US 11,553,220 B1
(45) Date of Patent: Jan. 10, 2023

(54) DYNAMIC THRESHOLD CALCULATION FOR VIDEO STREAMING

(71) Applicant: HULU, LLC, Santa Monica, CA (US)

(72) Inventors: Changsheng Xiang, Beijing (CN); Dingming Wu, Beijing (CN); Chunyang Wei, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/404,645

(22) Filed: Aug. 17, 2021

(51) Int. Cl.
*H04N 7/10* (2006.01)
*H04N 21/234* (2011.01)
*H04N 21/431* (2011.01)
*H04N 21/466* (2011.01)
*H04N 21/25* (2011.01)

(52) U.S. Cl.
CPC ..... *H04N 21/23424* (2013.01); *H04N 21/251* (2013.01); *H04N 21/4316* (2013.01); *H04N 21/4663* (2013.01); *H04N 21/4667* (2013.01)

(58) Field of Classification Search
CPC ............. H04N 21/2341; H04N 21/475; H04N 21/44224
USPC .......... 725/32; 705/14.48, 71, 73, 53, 54, 66
See application file for complete search history.

(56) References Cited

U.S. PATENT DOCUMENTS

2015/0339728 A1* 11/2015 Sura .................. G06Q 30/0277
705/14.73

* cited by examiner

*Primary Examiner* — Jivka A Rabovianski
(74) *Attorney, Agent, or Firm* — Kwan & Olynick LLP

(57) ABSTRACT

In some embodiments, a method receives an supplemental content placement and a context associated with a request for supplemental content to be displayed for the supplemental content placement. A first value is generated based on the context using a prediction network for a platform. The method determines probabilities for a plurality of types of request actions based on the context. Then, a threshold for the supplemental content placement is calculated based on the first value and the probabilities for the plurality of types of request actions. The method submits the threshold to a platform in a request for the platform to submit a second value for the supplemental content placement.

20 Claims, 8 Drawing Sheets

DYNAMIC THRESHOLD CALCULATION FOR VIDEO STREAMING

BACKGROUND

In video delivery, a provider may have inventory opportunities to place supplemental content in real time. The provider may use a real time selection process to select the supplemental content to display for the inventory opportunity. Typically, the provider may use an exchange that would forward the inventory opportunities to entities, such as demand side platforms (DSPs). The demand side platforms would evaluate the inventory opportunity and submit a bid based on a value they assign to the inventory opportunity. In some cases, the provider may set a threshold, such as a floor price, which is the minimum value the provider would accept from a bid.

The selection process is a real-time process that selects supplemental content while a video that is currently playing. However, a provider typically uses non-real-time methods to set the threshold. For example, the provider may set the threshold based on historical information, such as prior bid values. Using the historical information, the provider may set the threshold at a first value, but may find that that value is too high after setting the same value for a lime period. The provider may figure this out by analyzing the bidding process where demand side platforms may not bid on inventory opportunities because the threshold is too high. Accordingly, after using that threshold for multiple inventory opportunities, the provider may adjust the threshold to be lower. This process continues in an experimental manner. The above process is not real time in nature and thus does not set the threshold optimally. However, in an online environment, such as when videos are being streamed, a publisher may have limited time to set the threshold and thus uses the above process.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
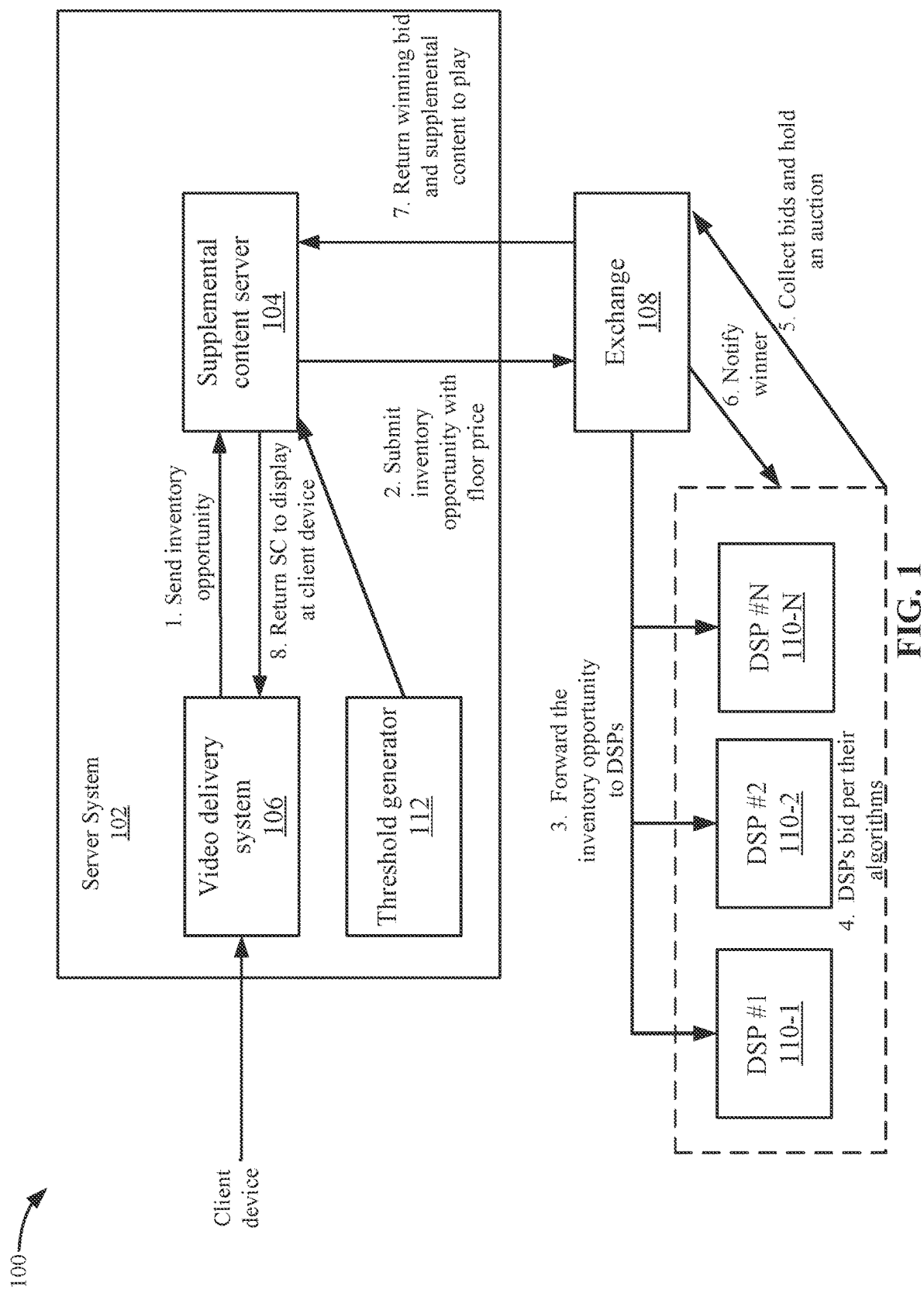
FIG. 1 depicts an example of a system for processing inventory opportunities according to some embodiments.

Described herein are techniques for a threshold prediction system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

As discussed above, a provider may have inventory opportunities to place supplemental content in real time during the playing of main content, such as during a break in the streaming of a video. A system sets a threshold in real time, such as a floor price, for a supplemental content placement when a request is received for placement. The supplemental content place may be an inventory opportunity in which supplemental content is placed. The threshold may be a minimum value that will be accepted for the inventory opportunity. The system may set the threshold for each inventory opportunity based on a context for the inventory opportunity. To be able to set the threshold based on the context, the system trains a prediction network for multiple platforms, such as demand side platforms (DSPs), that may participate in a process to provide supplemental content for the inventory opportunity. The system inputs the context into a respective prediction network to generate a value that the demand side platform may assign to the inventory opportunity.

There may be multiple different types of request actions that can be used by the demand side platforms. The request actions may be bidding strategies. For example, a provider may offer different types of deals, which may be referred to as invite-only auction (IOA) deals and unreserved fixed rate (UFR) deals. The invite-only auction deals require a bid value to be at least the same as or higher than the threshold. The unreserved fixed rate deals do not have a threshold for the bid value. The demand side platforms may select one of the types of deals and generate a bid value using a bidding strategy for the selected deal.

Demand side platforms may use different bidding strategies for the different types of deals. The system may model probabilities that demand side platforms may use different bidding strategies. For example, within the invite-only auction deals, different demand side platforms may use different bidding strategies to generate their bid values, such as a true value bidding strategy or a best response bidding strategy. Accordingly, a model may generate probabilities for the different bidding strategies that may be used in the invite-only auction deals in addition to taking into account some demand side platforms may use a bidding strategy for unreserved fixed rate deals. Using at least a portion of the probabilities for which deals may be submitted by demand side platforms and the value that is assigned to the inventory opportunity by the prediction network, the system may generate a threshold for the inventory opportunity. Using the prediction network may allow the system to generate thresholds per inventory opportunity based on the context for the inventory opportunity in the limited time that is required to find a demand side platform for the inventory opportunity. Further, by using the probability for the different bidding strategies that may be submitted improves the calculation of the threshold.

System Overview

FIG. 1 depicts an example of a system 100 for processing inventory opportunities according to some embodiments. System 100 includes a server system 102, a supplemental content server 104, an exchange 108, and demand side platforms 110-1 to 110-N.

Server system 102 may include a video delivery system 106 that delivers videos to the client devices. In some embodiments, video delivery system 106 may use a content delivery network (CDN) (not shown) to deliver the videos. The videos may be content that is requested by a user account associated with the client device. For example, a user account may request a movie, an episode of a show, etc. Although videos are described, it will be understood that other content may also be delivered, such as a website, page of content, etc.

Server system 102 may receive requests from client devices for supplemental content. For example, client devices may be displaying main content that includes an opportunity to display supplemental content. The client device may be playing a video and a break in the video is reached. During that break, inventory opportunities exist to display supplemental content. Video delivery system 106 may select supplemental content to display at the client device.

In some situations, video delivery system 106 may automatically select supplemental content for the inventory opportunities. The supplemental content may be referred to as primary deals that may have been agreed upon previously, and may specify delivery requirements, such as a number of impressions for an instance of supplemental content should be delivered over a time period. When supplemental content server 104 receives a supplemental content request, supplemental content server 104 may select a primary deal from eligible primary deals based on a context of the request, and return supplemental content for a primary deal to display at the client device. In some embodiments, supplemental content server 104 may communicate directly with the client device or video delivery system 106 may communicate the information to display the supplemental content to the client device.

In other cases, video delivery system 106 may attempt to find other entities to provide supplemental content. For example, video delivery system 106 may try to find entities to submit supplemental content that have not agreed to delivery requirements as that used in the primary deals. In some cases, this process occurs when video delivery system 106 may not have primary deals to deliver for an inventory opportunity, but there may be other reasons. In some embodiments, video delivery system 106 use an entity to coordinate the process, such as an exchange 108. Exchange 108 may be part of the provider system, a separate entity, or any other entity that can perform the process. Exchange 108 performs a selection process to select a demand side platform 110 to provide supplemental content for an inventory opportunity. Exchange 108 performs the selection process in real time when a request for supplement content is received, such as during the playing of main content. This may be different from using primary deals, where terms for the delivery of supplemental content are determined in advance. The terms for delivery of the supplemental content using the selection process may be determined upon receiving the request. There may be a limit in time to determine the supplemental content because the client device is streaming main content and the supplemental content should be delivered when a break in the main content is reached. System 100 includes logic to perform the selection process automatically without human input to meet the requirements for the time limit.

When exchange 108 is used, supplemental content server 104 may first determine that the selection process should be performed instead of delivering a primary deal, such as when there are no primary deals eligible for a current request for supplemental content. Then, supplemental content server 104 may have a threshold generated. For example, a threshold generator 112 may generate the threshold that should be provided to exchange 108. Threshold generator 112 may be part of supplemental content server 104 or separate from supplemental content server 104. As mentioned above, the threshold may be the minimum price that video delivery system 106 will accept for the inventory opportunity. Threshold generator 112 may generate the threshold automatically based on the context for the request in a time that meets the requirements for the time limit required by the selection process. The process of generating the threshold will be described in more detail below.

Supplemental content server 104 submits the inventory opportunity with the threshold to exchange 108. Exchange 108 may coordinate the selection process with demand side platforms 110-1 to 110-N. Demand side platforms 110 may be entities that can automatically participate in the selection process in real-time for an inventory opportunity. In some embodiments, due to the real-time nature due to the time limit, demand side platforms 110 are programmatic entities that perform the function of selecting a bid value based on specific algorithms that run on them.

Exchange 108 may forward the inventory opportunity to demand side platforms 110 with the threshold. Then, demand side platforms 110-1 to 110-N generate bid values per their respective bidding strategy algorithms, which may be proprietary to each demand side platform 110. As will be discussed in more detail below, demand side platforms 110 may submit bid values using different bidding strategies. Some of the bidding strategies may be based on the threshold, such as invite-only auction deals. Also, some bidding strategies may be based on deals that do not include a threshold, such as unreserved fixed-rate deals.

Exchange 108 collects the bid values from different demand side platforms 110 and holds a selection process (e.g., auction) to determine the winner for the inventory opportunity. For example, exchange 108 may select the highest bid value that is received with a requirement of the bid value being over the threshold. Then, exchange 108 notifies the winner of the selection process with the bid value, which is paid to video delivery system 106. The winner may provide information for the supplemental content, such as a link to access the supplemental content. Then, exchange 108 returns the winning bid value and supplemental content to play during the inventory opportunity to supplemental content server 104. Finally, supplemental content server 104 causes display of supplemental content at the client device. For example, supplemental content server 104 may return the link for the supplemental content to video delivery system 106, which can then send the link to the client device to cause the display of the supplemental content at the client device (e.g., the client device can use the link to request the content). Also, other ways of causing supplemental content to be displayed may be appreciated, such as supplemental content server 104 may provide information to the client device directly without communicating with video delivery system 106 to allow the supplemental content to be requested and displayed. Also, supplemental content server 104 or video delivery system 106 may automatically stream the supplemental content for the inventory opportunity.

An overview of the selection process will now be described in more detail. There may be different types of selection processes that can be used. In some embodiments, exchange 108 may use an auction to select the winning demand side platform. Conventionally, a global second price (GSP) auction may have been used. The global second price auction may charge the winner of the auction the second highest bid value. That is, the demand side platform may submit a bid that may win that has the highest hid value. However, instead of charging that demand side platform 110 with the highest bid value, exchange 108 takes the second highest bid value from another demand side platform 110, and charges that second highest bid value to the winning demand side platform 110. The setting of the threshold when a generalized second price auction is used may be a simple process. For example, if, over time, the threshold (or average) is higher than the second highest bid valued, video delivery system 106 may consider raising the threshold. However, if the highest bid values are below the threshold, then video delivery system 106 may consider lowering the threshold.

In some embodiments, exchange 108 may use a generalized first price auction where the winning bid value is charged to the winning demand side platform 110. When a generalized first-price auction is used, the bidding strategy used by demand side platforms 110 may be highly complex and may use different strategies. In the generalized second-price auction, demand side platforms may have used a single strategy, which may be a true-value bidding strategy. In the true-value bidding strategy, a demand side platform values the inventory opportunity and may hid at that value. The demand side platforms would not be charged their bid value so may be comfortable bidding at their true value with an understanding the value paid will be lower. However, with generalized first-price auctions, demand side platforms 110 may determine and use different strategies because the winning bid value may be charged to the demand side platform 110. For example, in addition to the true-value bidding strategy, some demand side platforms 110 may use a best-response bidding strategy, which may use the threshold as the bid value if the value of the inventory opportunity is larger than the threshold. Additionally, some demand side platforms 110 may decide to return a bid value for an unreserved fixed rate deal, which may be lower than the threshold. A demand side platform 110 may decide which bidding strategy to use. In some cases, a mixed bidding strategy may be used to make it harder to set the threshold, and the bidding strategy may be selected based on probabilities of using different bidding strategies, or be based on how demand side platforms 110 value the inventory opportunity. For example, if demand side platform 110 values the inventory opportunity higher, demand side platform 110 may use the true value bidding strategy. If the inventory opportunity is valued lower, demand side platform 110 may use the best-response bidding strategy. If the inventory opportunity is valued even lower, demand side platform 110 may use the unreserved fixed rate bidding strategy to submit a bid value below the threshold, which may only be accepted if other demand side platforms 110 did not submit a bid above their bid value.

Because of the different bidding strategies that may be used and the different types of deals that may be returned, setting the threshold in real time may be difficult when the threshold is set based on the context of each request that is processed. As will be discussed in more detail below, threshold generator 112 may use a prediction network to model the value that may be assigned by each demand side platform 110. Also, threshold generator 112 may model the probabilities of the different deals that could be used and also the different bidding strategies that could be used. Threshold generator 112 uses this information to generate a threshold based on the context for the inventory opportunity. Using the above components allows threshold generator 112 to be able to generate a dynamic threshold based on the context for the inventory opportunity in the amount of time required when an inventory opportunity request is received. The following will now describe the threshold generation in more detail.

Training Phase

Figure 2:
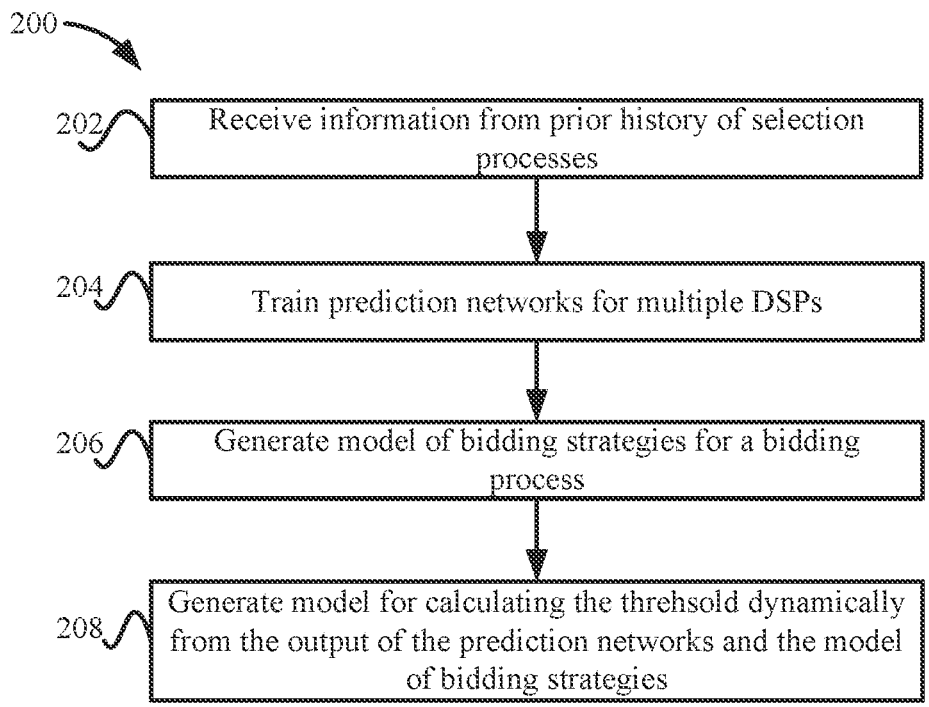
FIG. 2 depicts a simplified flowchart of a method for generating models for the threshold generation according to some embodiments.

Threshold generator 112 may generate models that can be used to generate the threshold. FIG. 2 depicts a simplified flowchart 200 of a method for generating models for the threshold generation according to some embodiments. At 202, threshold generator 112 receives information from a prior history of selection processes. The information may include the context for a bid, the threshold that was calculated, and the winning bid value. In some embodiments, threshold generator 112 may not know the other details of other bid values that were submitted because exchange 108 may be a separate entity from the provider.

At 204, threshold generator 112 trains a set of prediction networks for multiple demand side platforms 110. For example, each demand side platform 110 may have an associated prediction network that can be used to predict the value that a respective demand side platform 110 may assign to an inventory opportunity. Also, a prediction network may be used to predict a respective value for all demand side platforms 110 or a single prediction network may be used to predict values for multiple demand side platforms 110. As will be discussed below, the prediction networks may predict a probability distribution for a value that each demand side platform 110 may assign to the inventory opportunity, but different predictions may be used to predict the value that is assigned by demand side platforms 110.

In some embodiments, threshold generator 112 may use a training data set that includes information for bid values submitted by a respective demand side platform 110. Other bid values from other demand side platforms 110 may also be used in the training. Then, the parameters for a respective prediction network for a demand side platform 110 is trained to predict information for a value that the respective demand side platform 110 may assign to an inventory opportunity, such as information to generate a probability distribution for a value that the respective demand side platform 110 may assign to an inventory opportunity. In some embodiments, the output may be an average bid value and a variance. The average bid value and the variance may be used to generate a probability distribution. Other prediction networks for other demand side platforms 110 may also be trained similarly using a training set that may include data specific to each respective demand side platform 110. In the training, the parameters of prediction networks can be adjusted based on the history of behavior from a respective demand side platform 110, which may capture the bidding strategies that are used for that demand side platform 110. For example, a context is input into a prediction network and the output is compared to a bid value. The parameters are adjusted based on the difference between the output and the bid value such that the prediction network may output a value that is closer to the bid value. Because demand side platforms 110 may use different bidding strategies, training respective prediction networks to predict the different behavior (e.g., bidding strategies) of respective demand side platforms 110 improves the process of generating a threshold. This is different from using fixed parameters for multiple demand side platforms 110 or using non-real-time processes that review historical data to set the threshold because the prediction network uses the present context for the request. This is an improvement that generates a more accurate value, but also within the time limit required.

At 206, threshold generator 112 generates a model of bidding strategies for the bidding process. For example, as discussed above, demand side platform 110 may have algorithms that may use different types of deals in the bidding process. Also, within the types of deals, different bidding strategies may be used. The model may predict different probabilities that different bidding strategies may be used based on a context. Also, threshold generator 112 may generate a model to generate a value for unreserved fixed-rate deals. Although the threshold may be applicable to invite-only auction deals, bid values for unreserved fixed-rate deals may also be returned and this model may predict the bid value that is returned for these types of deals.

At 208, threshold generator 112 generates a model for calculating the threshold dynamically from the output of the prediction networks and the output of the model of bidding strategies. The threshold calculation model may also use other information, such as an internal value assigned to the inventory opportunity. The internal value may be a value assigned by the provider if the provider does not use supplemental content from a demand side platform 110. For example, the provider may display internal supplemental content, such as content that promotes original content. The threshold calculation model may take the input from the prediction networks and the probabilities output by the model for bidding strategies to generate a threshold. The model for calculating the threshold will be described in more detail below.

Figure 3:
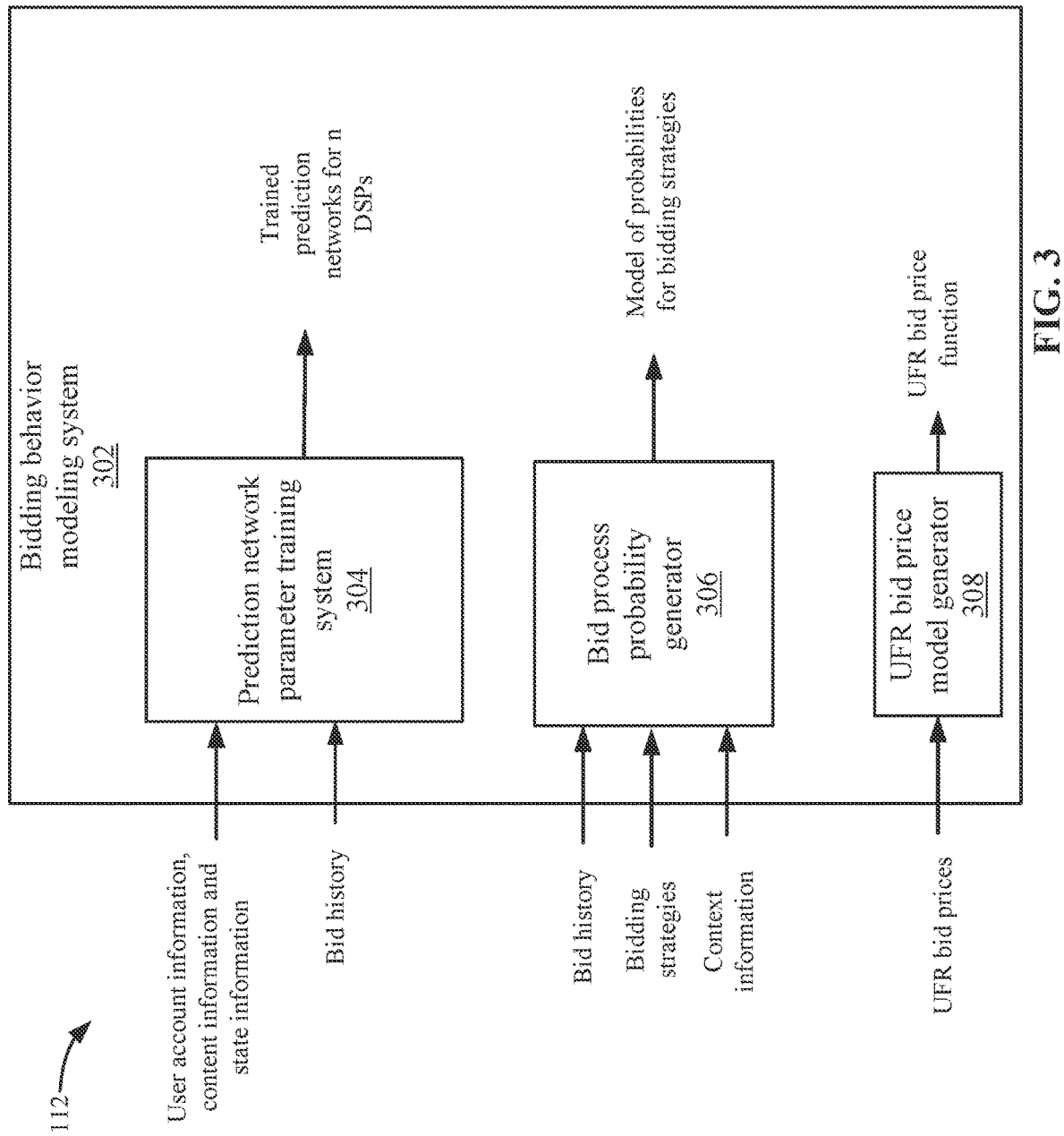
FIG. 3 depicts an example of a bidding behavior modeling system that can be used to generate the models according to some embodiments.

FIG. 3 depicts an example of a bidding behavior modeling system 302 that can be used to generate the models according to some embodiments. Bidding behavior modeling system 302 may include a prediction network parameter training system 304, a bid process probability generator 306, and an unreserved fixed rate bid value function generator 308. Prediction network parameter training system 304 may train each prediction network for respective demand side platforms 110. Inputs to prediction network parameter training system 304 may include the inputs that would be used to generate the probability distribution for the predicted value that is assigned to the inventory opportunity, such as user account information, content information, and state information. Additionally, supervised information, such as a bid history, can be input to train the parameters of each prediction network. The user account information may include information about the user account that is using the client device, such as the age, gender, and other user account information. The content information may be information for the main content being watched in which a break for the inventory opportunity is encountered, such as the genre of the content (e.g., news, sports, . . . , drama), the rating of the content (e.g., TV-14, TV-G, . . . TV-Y), the content partner of the content (e.g., a network or studio), the device the user account is using (mobile phone, living room device, etc.), etc. The state information may be about a current state of the request, such as the current hour, the day of the week, a state of the user account, a location of the client device, etc. The bid history may be the history of bid values that are received and respective thresholds that were used. For example, the bid history may list the bid value that won the auction for the context information and the threshold that was used. Prediction network parameter training system 304 may train parameters of the prediction network to predict the predicted value based on the input information. The output is the trained prediction networks for N demand side platforms 110. Each trained prediction network may receive context information and then output a probability distribution to predict the value for the context.

A bid process probability generator 306 may determine a model of probabilities for different algorithms for bidding strategies that may be used by demand side platforms 110, such as bidding strategies for unreserved fixed-rate deals and invite-only auction deals. The bid process probability generator 306 may receive a bid history, bidding strategies, and context information. The output of bid process probability generator 306 may be a model of probabilities for different algorithms, such as the algorithms to generate bid values for unreserved fixed-rate deals and invite-only auction deals. The model may predict the probabilities of which bidding strategy that demand side platforms 110 may use to submit a deal. To generate the probabilities, the model may use a history of bid values. One method of generating the probabilities will be described in more detail now, but other methods may be used.

Figure 4:
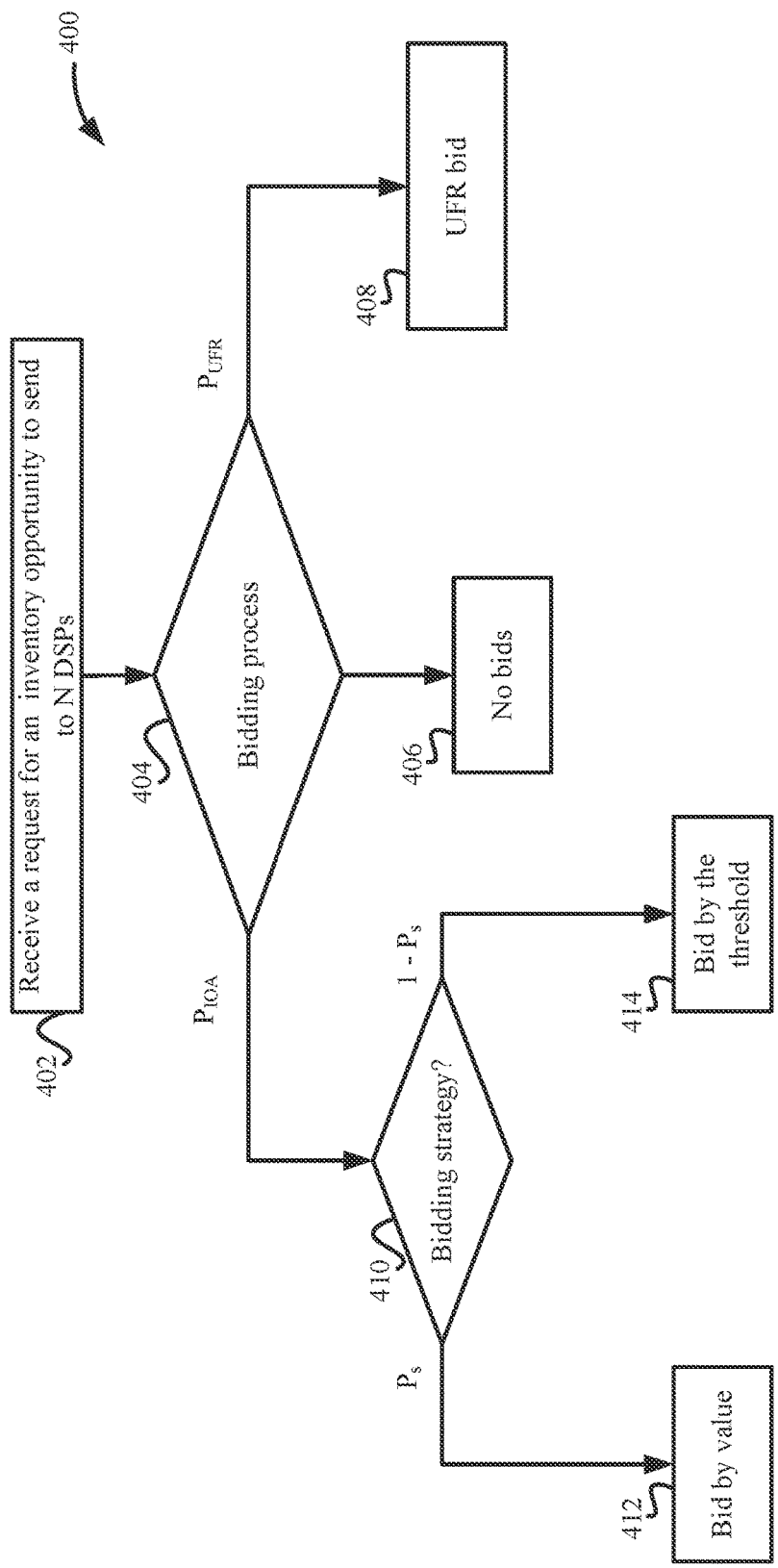
FIG. 4 depicts an example of bidding strategies that may be used by demand side platforms according to some embodiments.

FIG. 4 depicts an example of bidding strategies that may be used by demand side platforms 110 according to some embodiments. At 402, bid process probability generator 306 receives inventory opportunity to send to N demand side platforms 110. At 404, bid process probability generator 306 models the bidding strategy for demand side platforms 110. In the bidding process, different behavior may result. For example, at 406, a demand side platform 110 may decide not to bid. In this case, exchange 108 may receive no bid or no response for the inventory opportunity and the demand side platform 110 will not participate in providing supplemental content for this inventory opportunity. Also, at 408, there is a probability $P_{UFR}$ that the demand side platform 110 would use a bidding strategy to generate a bid value that would be for an unfixed-rate auction. This bid value would be below a threshold. However, if this bidding strategy is not used, there is a probability $P_{IOA}$ that demand side platform 110 may use a bidding strategy to generate an invite-only auction bid value, which may be a bid value at or above the threshold.

As discussed above, there may be different bidding strategies that may be used to generate the bid value, such as when using invite-only auction deals. At 410, bid process probability generator 306 determines the bidding strategy that may be used. For example, a probability $P_S$ may be a probability that a true-value bidding strategy is used at 412. Also, at 414, bid process probability generator 306 determines a probability of $1-P_S$ that a bid-by-floor-price strategy may be used. The true-value bidding strategy may use the value that is assigned to the inventory opportunity as the bid value when the value assigned to the inventory opportunity is larger than the threshold. For example, the true-value bidding strategy may be summarized by:

$$b_j(v_i, r_i) = \begin{cases} 0 & v_i < r_i \\ v_i & v_i \geq r_i \end{cases}.$$

The function h is the bidding strategy that is used based on the value assigned to the inventory opportunity $v_i$ and the threshold $r_i$. In this case, when the value $v_i$ is greater than the threshold $r_i$, demand side platform 110 returns the value $v_i$ as the bid value. Here, demand side platform 110 may value the inventory opportunity as true value and may want to place supplemental content for the inventory opportunity. No bid is submitted when the threshold is greater than the value assigned to the inventory opportunity.

In the best-response bidding strategy, demand side platform 110 may not value the inventory opportunity as high as when using the true-value bidding strategy. That is, demand side platform 110 may consider the inventory opportunity worth bidding on but may not value placing the supplemental content in the inventory opportunity as much. In this case, demand side platform 110 may use the threshold as the bid value if the value for the inventory opportunity is larger than the threshold. For example, the best-response bidding strategy may be summarized by:

$$b_j(v_i, r_i) = \begin{cases} r_i r_i \le v_i \\ 0 r_i > v_i \end{cases}.$$

In the above, the threshold $r_i$ is used as the bid value when the threshold is less than or equal to the value assigned to the inventory opportunity. No bid is submitted when the threshold is greater than the value assigned to the inventory opportunity.

Although the above two types of bidding strategies may be used, it is recognized that other bidding strategies may also be appreciated. As the number of possible bidding strategies increases, the modeling of the bidding behavior may become more complex.

In the overall process, bid process probability generator 306 may analyze the input data and determine a probability that demand side platform 110 may use an invite-only auction deal type with the probability $P_{IOA}$. The probability $P_{IOA}$ may be based on other deal types that may be used. In this example, the other deal type is probability $P_{UFR}$. Bid process probability generator 306 can determine the probability that demand side platform 110 may use a bidding strategy for one of the deal types.

After determining the probability $P_{IOA}$, bid process probability generator 306 determines probabilities for the different bidding strategies that may be used within the invite-only auction deal types. For example, a probability $P_S$ that a demand side processor 110 would use a true-value bidding strategy, such as when the demand side processor 110 places higher value on winning the bid process for the inventory opportunity. Also, bid process probability generator 306 determines a probability $1-P_S$ that a demand side processor 110 would use a best-response bidding strategy to generate the bid using the threshold.

In the simple example, the hid history data may be as follows:

TABLE 1

| Inventory type | Predicted value | Deal type | Bid value | Threshold |
|---|---|---|---|---|
| Female, age 25 | 38 | IOA | 35 | 35 |
| Female, age 25 | 38 | IOA | 38 | 35 |
| Male, age 35 | 33 | UFR | 30 | 35 |

In Table I, the inventory type may list a context of the user account, which may be a female or male, and the age. The predicted value may be based on the output of the prediction network for the demand side platform. The bid value may be the bid value that was received for the deal. The threshold is the threshold that was used. The deal type may be either an invite-only auction deal or unreserved fixed-rate deal. In some embodiments, the deal type can be determined based on the bid value. For example, a bid value that is at or above the threshold may mean that demand side platform 110 may have used the invite only auction bidding strategy. Also, a bid below the threshold may mean the demand side platform 110 used the unreserved fixed-rate bidding strategy. The reasoning is that an unreserved fixed-rate may submit a lower bid values than the threshold, but any invite-only auction bidding strategy would submit a bid value at or above the threshold. In the historical data, the third inventory opportunity (e.g., third row) used an unreserved fixed-rate bidding strategy. Also, the first and second inventory opportunities (e.g., first and second rows) used invite-only auction bidding strategies. In this case, the probability $P_{IOA}$ is ⅔ because two out of three bid values were for IOA deals or for invite-only auction deals. A probability $P_{UFR}$ is ⅓ because one out of three bid values was for an unreserved fixed-rate deal.

There are two invite-only auction deals in the historical data, and the probability $P_S$ that a bidding strategy of the true value bidding strategy is used was ½. For example, the bidding strategy may be based on the bid value and the threshold used. If the bid value is higher than the threshold, then it can be determined that the true-value bidding strategy is used. However, if the bid value equals the threshold, then it may be determined that the best-response bidding strategy is used. As can be seen, the first bid value for the first inventory opportunity may use the best-response bidding strategy because the bid value of 35 is equal to the threshold. Also, the second hid value for the second inventory opportunity may have used the true-value bidding strategy because the bid value of 38 is higher than the threshold of 35. Accordingly, the probability $P_S$ is ½. The above is a simple model to determine the probabilities that may be assigned to the different bidding strategies. In some embodiments, parameters of a model may be trained to predict the probabilities for unreserved fixed-rate bidding strategies and invite-only auction bidding strategies, other bidding strategies that may be used.

The model may be generated for each demand side platform 110 based on prior behavior. Also, a single model may be used to generally predict which bidding strategy may be used. The model may receive a context and output the probabilities based on the context for the different bidding strategies.

Referring back to FIG. 3, an unreserved fixed-rate bid value model generator 308 receives unreserved fixed-rate bid values and outputs an unreserved fixed-rate bid value function. The unreserved fixed-rate bid value function may be a distribution that can be used to predict an unreserved fixed-rate bid value. For example, if there are 6,000 unreserved fixed-rate deals, and the bid value on 1,000 unreserved fixed-rate deals is $10.00, the bid value for 2,000 unreserved fixed-rate deals is $20.00 and the remaining 3,000 unreserved fixed-rate deals is $30.00, unreserved fixed-rate bid value model generator 308 may generate a function that may be based on a distribution. For example, there is a ⅙ probability that the bid value of the unreserved fixed-rate deal is $10.00 because 1,000/6,000=⅙. There is a 2/6 probability that the bid value of the unreserved fixed-rate deal is $20.00 since 2,000/6,000=2/6. There is a 3/6 probability that the bid value of the unreserved fixed-rate deal is $30.00 because 3,000/6,000=3/6. Unreserved fixed-rate bid value model generator 308 may generate a function g(u; r) that is based on this probability distribution. The variable u is the value of the unreserved fixed-rate bid and the value r is a parameter of the distribution. In the above example, the function g(u; r) may be equal to 30 because there is only one unreserved fixed-rate deal, but the function may be more complicated as described in the above example with 6,000 different bid values.

The above information may be used to calculate the threshold, which will be described in more detail now.

Threshold Generation

Figure 5:
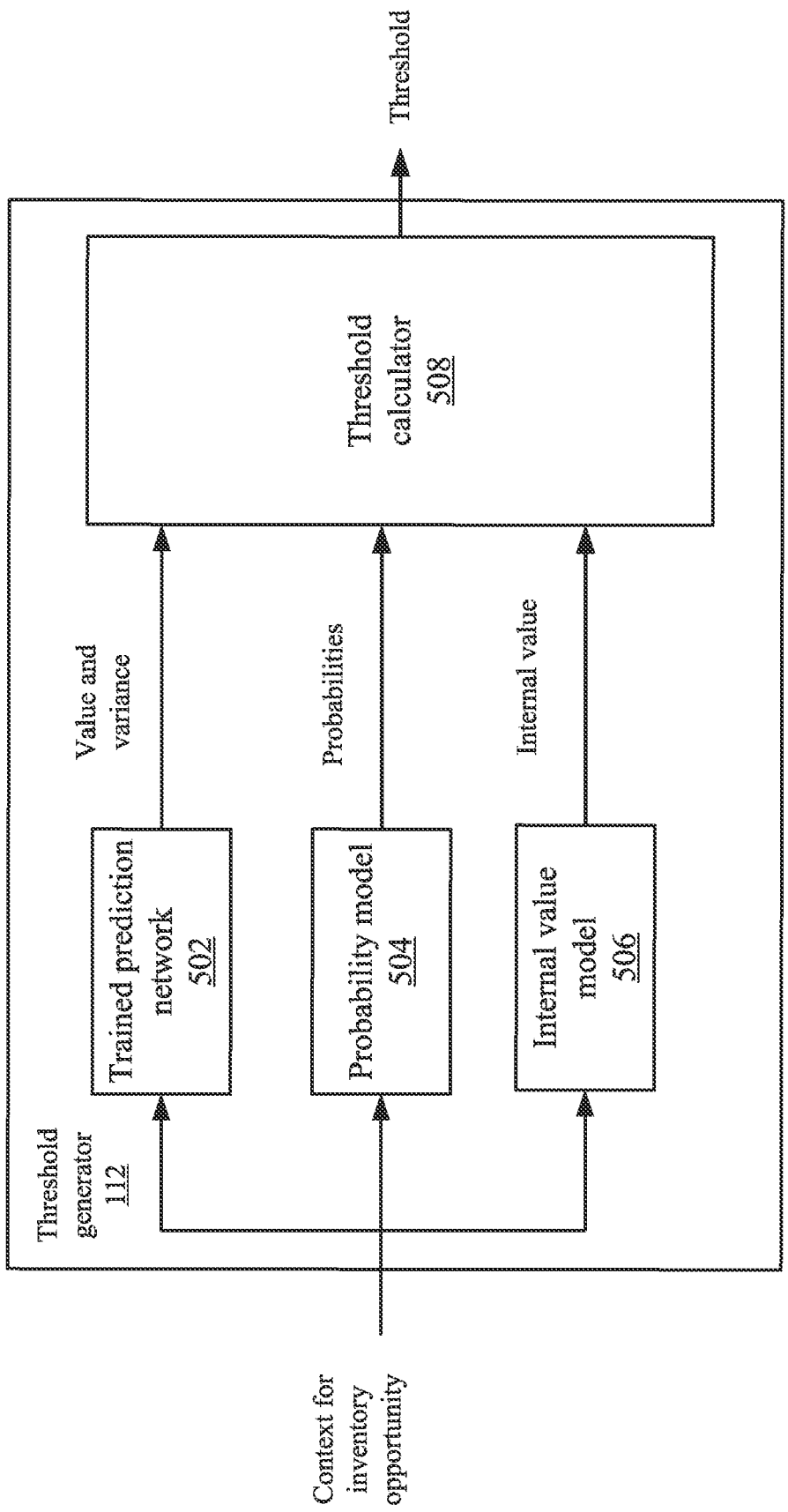
FIG. 5 depicts a more detailed example of threshold generator according to some embodiments.

FIG. 5 depicts a more detailed example of threshold generator 112 according to some embodiments. Threshold generator 112 includes a trained prediction network 502, a probability model 504, and an internal value model 506. A context for the inventory opportunity is received. Trained prediction network 502 receives the context and can output information for a value that the respective demand side platform 110 may assign to an inventory opportunity, such as a value and a variance. The value may be a mean (e.g., average) value that is predicted to be assigned by a specific demand side processor 110 to the inventory opportunity. The variance may be a measurement of the expectation of deviance from the mean value. For example, the mean value and variance may be a probability distribution that is used to predict the value that a demand side processor 110 may assign to the inventory opportunity.

Probability model 504 receives the context and can calculate the probabilities for the bidding strategies. For example, probability model 504 may calculate the probability $P_{UFR}$, $P_{IOA}$, and probability $P_S$. The context may be input into the probability model, which outputs the probabilities for the context. These probabilities may be based on modeling that demand side platforms 110 may use the different bidding strategies when receiving an inventory opportunity with this context.

Internal value model 506 receives the context and generates an internal value. The internal value may be the value assigned if the provider delivers internal supplemental content. That is, the internal supplemental content is provided by the provider and the provider does not receive any money for providing that supplemental content. For example, the internal supplemental content may promote one of the videos being offered by video delivery system 106.

Figure 6:
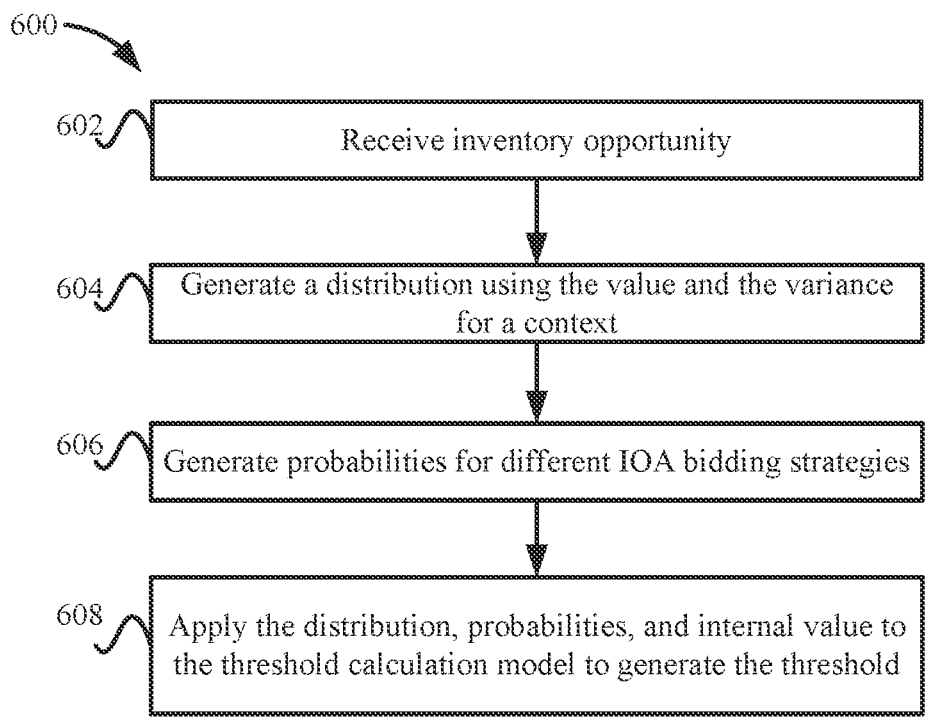
FIG. 6 depicts a simplified flowchart of a method for generating the threshold according to some embodiments.

A threshold calculator 508 may calculate the threshold from the received information. FIG. 6 depicts a simplified flowchart 600 of a method for generating the threshold according to some embodiments. At 602, threshold calculator 508 receives the inventory opportunity. At 604, threshold calculator 508 generates a distribution using the value and the variance for a context. The distribution may place the mean of the distribution at the value provided and use the variance to generate the distribution. In some embodiments, a normal distribution with a mean of X, such as $5 dollars, and a variance, such as $1 dollar, may be used, but other distributions, such as logarithmic distributions may be used.

At 606, threshold calculator 508 generates probabilities for the different bidding strategies, such as the invite-only auction bidding strategies. Probabilities for the invite-only auction bidding strategies are used because these strategies use the threshold. For example, depending on the probabilities that are received, threshold calculator 508 may assign a probability to each bidding strategy that could be used. First, the probabilities of using an invite-only auction bidding strategy and/or an unreserved fixed rate bidding strategy are determined. Then, within the invite-only auction bidding strategies, threshold calculator 508 may calculate probabilities for bidding strategies, such as a probability $P_S$ for the true value bidding strategy and probability $1-P_S$ for the best-response bidding strategy. If more than two bidding strategies are used, threshold calculator 508 will be assigned the probabilities as needed across the bidding strategies.

At 608, threshold calculator 508 applies the distribution, probabilities, and internal value to a threshold calculation model to generate the threshold. Threshold calculator 508 may use a model that is based on an expected revenue to determine the threshold. The expected revenue E(r) may include multiple parts based on the bidding strategies that are used. Expected revenue can be used to predict the threshold because video delivery system 106 may want to maximize expected revenue and the threshold has an influence on expected revenue. The goal may be to maximize bid values by setting a proper threshold and thus the expected revenue may be used to predict the threshold. For example, the expected revenue may include the following five parts. For simplicity, the following notations are used:

$$F(v)=F(v;\theta_j,x_i), f(v)=f(v;\theta_j,x_i), P_s=P_{s1}, P_{s2}=1-P_{s1},$$

where $F_j(v; \theta_j, x_i)$ is the cumulative distribution function for all prediction networks, $f_j(v; \theta_j, x_i)$ is a distribution function for a prediction network for demand side platform j, $P_{s1}$ is the probability that a true value auction bidding strategy is used, and $P_{s2}$ is the probability that a best-response bidding strategy is used.

Part I may be revenue from bidding strategies that submit bid values at the threshold. That is, the bidding strategy may be a best-response bidding strategy for an invite-only auction deal. If the floor price is $r_i$, exchange 108 may return an invite-only auction deal with its bid value $w_i$ equaling threshold based on:

$$Pr(w_i = r_i) = \sum_{j=1}^{n} C_n^j P_{s2}^j P_{ioa}^j (1 - F(r_i))^j (1 - P_{ioa} + P_{ioa}F(r_i))^{n-j} =$$
$$(1 - P_{ioa} + P_{ioa}F(r_i) + P_{s2}P_{ioa}(1 - F(r_i)))^n - (1 - P_{ioa} + P_{ioa}F(r_i))^n$$

where C is a combination. So the expected revenue when the floor price is T is that the floor price 7' is multiplied by its probability Pr(w=r), that is:

$$r((1-P_{ioa}+P_{ioa}F(r)+P_{s2}P_{ioa}(1-F(r)))^n - (1-P_{ioa}+P_{ioa}F(r))^n)$$

Part II may be revenue from bidding strategies that submit bid values above the threshold. That is, the bidding strategy may be a best-response bidding strategy for an invite-only auction deal. If the floor price is $r_i$, exchange 108 may return an invite-only auction deal with its bid value $w_i$ being larger its floor price based on:

$$\hat{f}(w)=nP_{s1}P_{ioa}f(w)(P_{s2}P_{ioa}(1-F(w)+1-P_{ioa}+P_{ioa}F(w)))^{n-1}$$

The expected revenue when the floor price is r is the floor price r multiplied by its probability density, and the bid value should be integrated from the threshold r to infinity for values above the threshold:

$$\int_r^\infty v(nP_{s1}P_{ioa}f(v)(P_{s2}P_{ioa}(1-F(v)+1-P_{ioa}+P_{ioa}F(v)))^{n-1})dv.$$

Part III may be revenue from bidding strategies that submit bid values below the threshold. The bid value is above the internal cost $m_i$ because the internal supplemental content would be used instead. The unreserved fixed rate auction deal is based on the probability density function g(u, r). The expected revenue is the bid value multiplied by its probability, which is integrated from the internal value to infinity using:

$$P_{ufr} \int_{m_i}^{\infty} tg(t)dt.$$

Part IV may be revenue from bidding strategies that submit bid values below the threshold that are below the internal cost. The expected revenue is the bid value multiplied by its probability, which is integrated from zero to the internal cost $m_i$ using:

$$P_{ufr} \int_0^{m_i} m_i g(t)dt.$$

Part V is when no bid values are returned by exchange 108 based on the threshold. The expected revenue of not receiving a bid value is:

$$(1-P_{ufr}-(1-(1-P_{ioa}+P_{ioa}F(r))^n))m_i.$$

In the above, the internal cost $m_i$ multiplied by the probability of not receiving a bid value to capture whether using the internal value is better.

The expected revenue may be based on the above five parts. That is, video delivery system 106 may want to maximize the expected revenue. However, the threshold may depend on the first part, the second part, and the fifth part. Threshold generator 112 may derive the optimal floor price r using a gradient method that determines the threshold that maximizes revenue using:

$$\frac{\partial u(r)}{\partial r} = 0 \Rightarrow r =$$

$$\frac{(1 - P_{ioa} + P_{ioa}F(r) + P_{s2}P_{ioa}(1 - F(r)))^n - (1 - P_{ioa} + P_{ioa}F(r))^n}{n(1 - P_{ioa} + P_{ioa}F(r))^{n-1}P_{ioa}f(r)} + m_i$$

So, the optimal threshold should satisfy the following:

$$r = \frac{(1 - P_{ioa} + P_{ioa}F(r) + P_{s2}P_{ioa}(1 - F(r)))^n - (1 - P_{ioa} + P_{ioa}F(r))^n}{n(1 - P_{ioa} + P_{ioa}F(r))^{n-1}P_{ioa}f(r)} + m_i$$

When the inventory opportunity is received, threshold generator 112 may generate the values for the above elements. Then, threshold generator 112 may calculate the threshold using the above. This may apply the probabilities of different bidding strategies to the predict value that may be used by demand side platforms 110. Also, the internal value affects the threshold because a higher internal value may mean a higher threshold is used for the supplemental content from a demand side platform 110 to be used.

Conclusion

Accordingly, using the above threshold generation, a system can generate the threshold based on the context received for an inventory opportunity. By incorporating the probabilities of the different bidding strategies that can be used while also using the prediction network to estimate the value that each demand side platform 110 may assign to the inventory opportunity, the threshold can be calculated in the amount of time required for submission to the bidding process. This may be important when the bidding process is performed for a break within main content that is being currently viewed by a client device.

System

Figure 7:
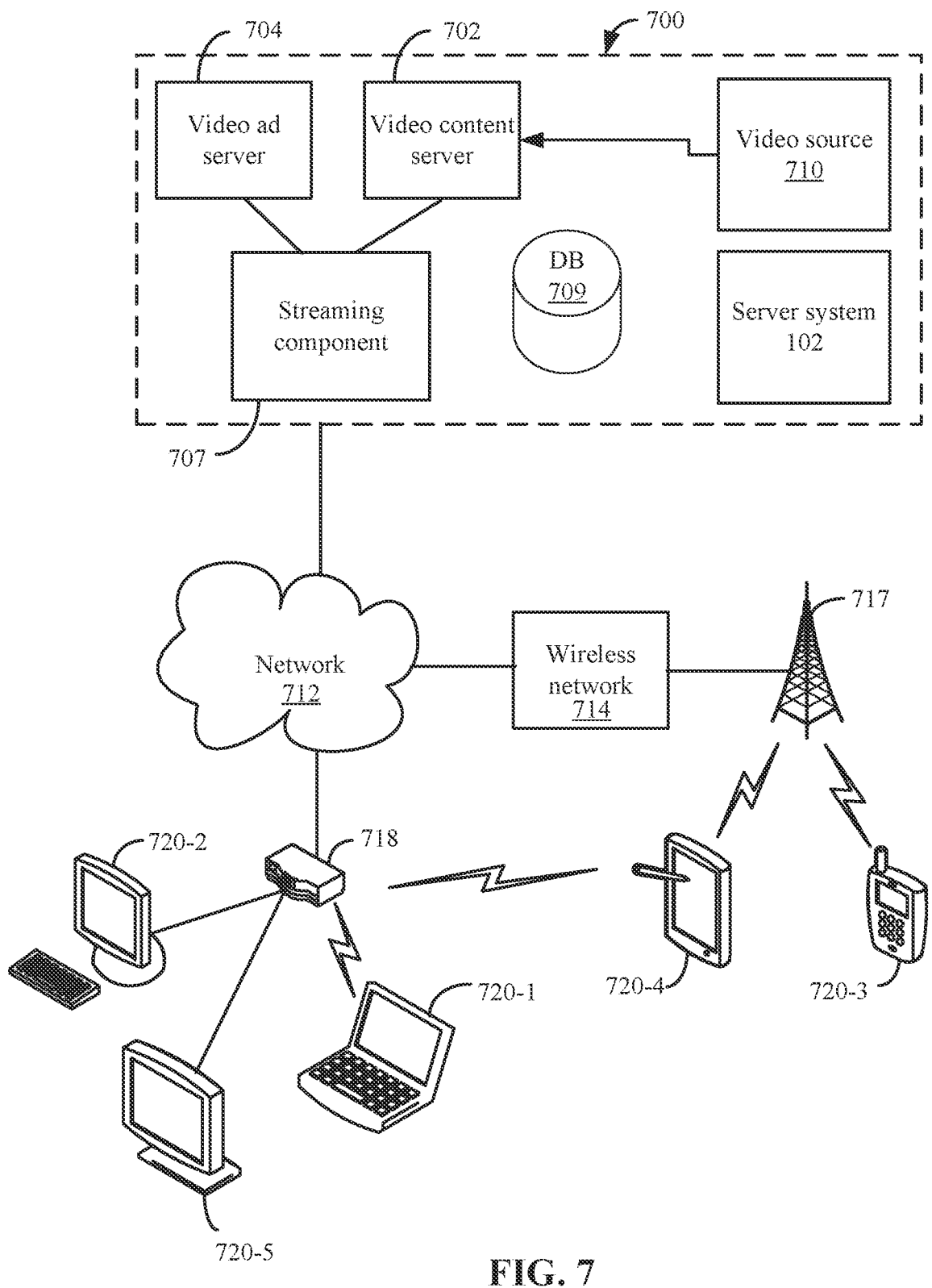
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include server system 102 or other components of system 100.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HyperText Transfer Protocol (HTTP) and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming arc HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
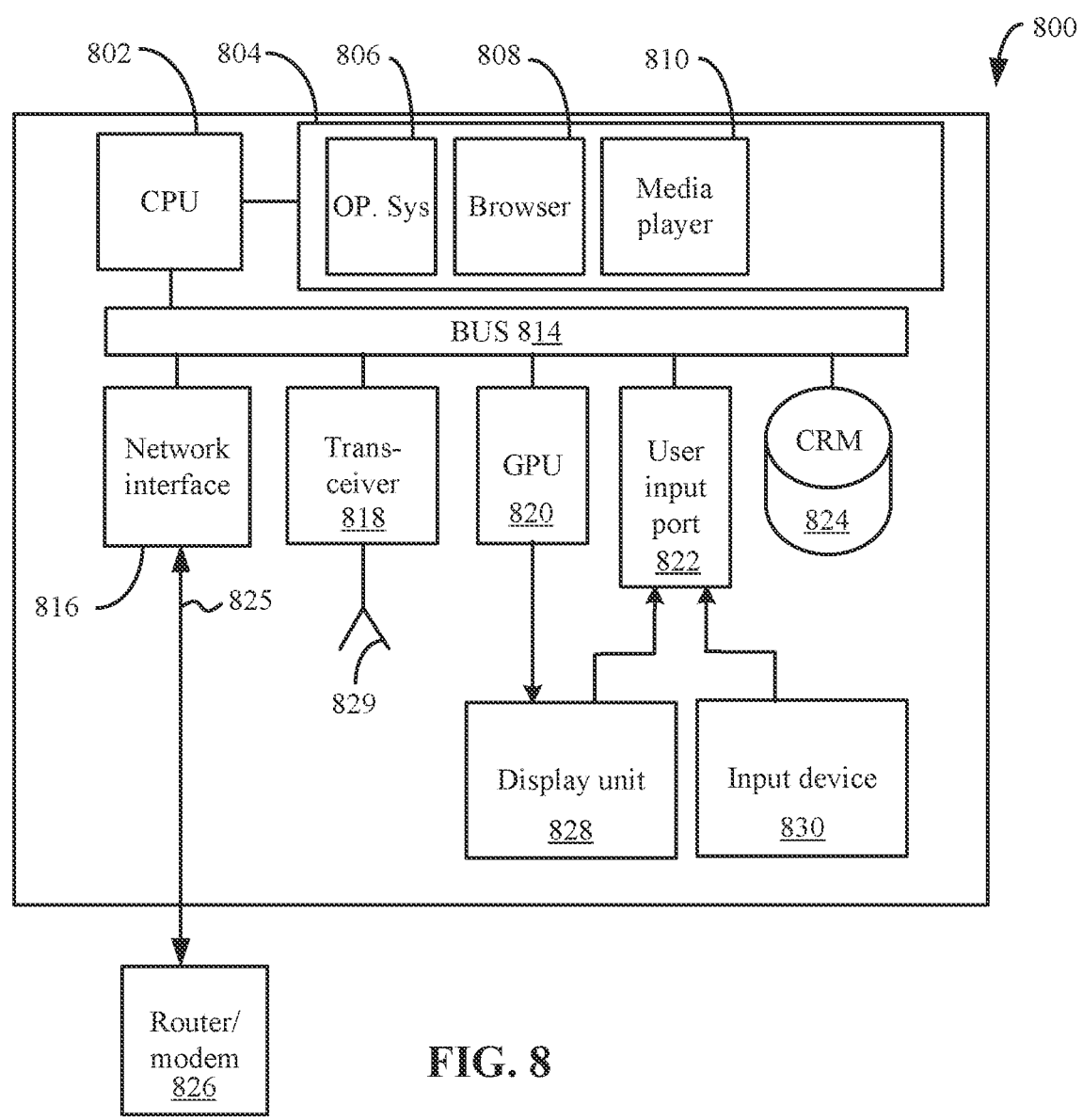
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera, or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Example Embodiments

In some embodiments, a method comprising: receiving, by a computing device, a supplemental content placement and a context associated with a request for supplemental content to be displayed for the supplemental content placement; generating, by the computing device, information to predict a first value that will be assigned by a platform based on the context using a prediction network for the platform; determining, by the computing device, probabilities for a plurality of types of request actions based on the context; calculating, by the computing device, a threshold for the supplemental content placement based on the first value and the probabilities for the plurality of types of request actions; and submitting, by the computing device, the threshold to the platform in a request for the platform to submit a second value for the supplemental content placement.

In some embodiments, the method further comprising: submitting the threshold in a request to a plurality of platforms to each submit a second value for the supplemental content placement.

In some embodiments, the method further comprising: receiving a plurality of second values from at least a portion of the plurality of platforms; and selecting one of the plurality of second values.

In some embodiments, the method further comprising: receiving supplemental content from a platform associated with the one of the plurality of second values that is selected.

In some embodiments, the method further comprising: causing display of the supplemental content on a client for the supplemental content placement.

In some embodiments, the prediction network is trained based on a history of received second values for the platform, wherein parameters of the prediction network are adjusted to predict the information for the first value that the platform will assign to the supplemental content placement.

In some embodiments, determining the probabilities comprises: determining the plurality of types of request actions that may be used, wherein a first type of bidding strategy uses the threshold to generate the second value and a second type of bidding strategy does not use the threshold to generate the second value; and assigning a first probability to the first type of bidding strategy and a second probability to the second type of bidding strategy.

In some embodiments, the method further comprising: from the first type of bidding strategy, determining a third type of bidding strategy that generates the second value that is above the threshold and a fourth type of bidding strategy generates the second value as equal to the threshold; and assigning a third probability to the third type of bidding strategy and a fourth probability to the fourth type of bidding strategy.

In some embodiments, calculating the threshold comprises: using the first probability, the third probability, and the fourth probability to calculate the threshold.

In some embodiments, calculating the threshold comprises: using the information for the first value and an internal value that is assigned to the supplemental content placement with the first probability, the third probability, and the fourth probability to calculate the threshold.

In some embodiments, determining the probabilities comprises: determining the plurality of types of request actions that may be used by a respective platform, wherein a first type of bidding strategy generates the second value that is above the threshold and a second type of bidding strategy generates the second value as equal to the threshold; and assigning a first probability to the first type of bidding strategy and a second probability to the second type of bidding strategy.

In some embodiments, the supplemental content placement is in a break during playing of main content.

In some embodiments, the method further comprising: receiving a request for the supplemental content for the supplemental content placement, wherein the supplemental content placement is in a break in playing main content and the supplemental content should be determined in a period of time until the break is reached.

In some embodiments, the method further comprising: training a set of prediction networks for a plurality of platforms based on historical information from the plurality of platforms; and using the set of prediction networks to generate the information for the first value based on the context for each of the plurality of platforms.

In some embodiments, the context is for a user account that is associated with the request. In some embodiments, the threshold is submitted to the platform when supplemental content with a pre-agreed upon second value is not found for the supplemental content placement.

In some embodiments, a non-transitory computer-readable storage medium containing instructions, that when executed, control a computer system to be operable for: receiving a supplemental content placement and a context associated with a request for supplemental content to be displayed for the supplemental content placement; generating information to predict a first value that will be assigned by a platform based on the context using a prediction network for the platform; determining probabilities for a plurality of types of request actions based on the context; calculating a threshold for the supplemental content placement based on the first value and the probabilities for the plurality of types of request actions; and submitting the threshold to a platform in a request for the platform to submit a second value for the supplemental content placement.

In some embodiments, the method further operable for: submitting the threshold in a request to a plurality of platform to submit a second value for the supplemental content placement; and selecting one of the plurality of second values.

In some embodiments, determining the probabilities comprises: determining the plurality of types of request actions that may be used, wherein a first type of bidding strategy uses the threshold to generate the second value and a second type of bidding strategy does not use the threshold to generate the second value; and assigning a first probability to the first type of bidding strategy and a second probability to the second type of bidding strategy.

In some embodiments, an apparatus comprising: one or more computer processors; and a non-transitory computer-readable storage medium comprising instructions, that when executed, control the one or more computer processors to be operable for: receiving a supplemental content placement and a context associated with a request for supplemental content to be displayed for the supplemental content placement; generating information to predict a first value that will be assigned by a platform based on the context using a prediction network for the platform; determining probabilities for a plurality of types of request actions based on the context; calculating a threshold for the supplemental content placement based on the first value and the probabilities for the plurality of types of request actions; and submitting the threshold to a platform in a request for the platform to submit a second value for the supplemental content placement.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a supplemental content placement and a context associated with a request for supplemental content to be displayed for the supplemental content placement during a break that is encountered while main content is being played;
   generating, by the computing device, information to predict a first value that will be assigned by a platform based on the context using a prediction network that is trained to predict the first value using data specific to the platform, wherein the first value represents a value of submitting a bid for the supplemental content placement;
   determining, by the computing device, probabilities for a plurality of types of request actions based on the context, wherein different request actions comprise different bidding strategies that are used to determine the first value of the bid;
   calculating, by the computing device, a threshold for the supplemental content placement based on the first value and the probabilities for the plurality of types of request actions; and
   submitting, by the computing device, the threshold to the platform in a request for the platform to submit a bid for the supplemental content placement, wherein the threshold should be met by the bid to be accepted for the supplemental content placement, and wherein a second value is received for the bid from the platform and used to determine whether the platform is selected for the supplemental content placement during the break.

2. The method of claim 1, further comprising:
submitting the threshold in a request to a plurality of platforms to each submit a second value for the supplemental content placement.

3. The method of claim 2, further comprising:
receiving a plurality of second values from at least a portion of the plurality of platforms; and
selecting one of the plurality of second values.

4. The method of claim 3, further comprising:
receiving supplemental content from a platform associated with the one of the plurality of second values that is selected.

5. The method of claim 4, further comprising:
causing display of the supplemental content on a client for the supplemental content placement.

6. The method of claim 1, wherein the prediction network is trained based on a history of received second values for the platform, wherein parameters of the prediction network are adjusted to predict the information for the first value that the platform will assign to the supplemental content placement.

7. The method of claim 1, wherein determining the probabilities comprises:
determining the plurality of types of request actions that may be used, wherein a first type of bidding strategy uses the threshold to generate the second value and a second type of bidding strategy does not use the threshold to generate the second value; and
assigning a first probability to the first type of bidding strategy and a second probability to the second type of bidding strategy.

8. The method of claim 7, further comprising:
from the first type of bidding strategy, determining a third type of bidding strategy that generates the second value that is above the threshold and a fourth type of bidding strategy generates the second value as equal to the threshold; and
assigning a third probability to the third type of bidding strategy and a fourth probability to the fourth type of bidding strategy.

9. The method of claim 8, wherein calculating the threshold comprises:
using the first probability, the third probability, and the fourth probability to calculate the threshold.

10. The method of claim 9, wherein calculating the threshold comprises:
using the information for the first value and an internal value that is assigned to the supplemental content placement with the first probability, the third probability, and the fourth probability to calculate the threshold.

11. The method of claim 1, wherein determining the probabilities comprises:
determining the plurality of types of request actions that may be used by a respective platform, wherein a first type of bidding strategy generates the second value that is above the threshold and a second type of bidding strategy generates the second value as equal to the threshold; and
assigning a first probability to the first type of bidding strategy and a second probability to the second type of bidding strategy.

12. The method of claim 1, wherein the platform should be selected for the supplemental content placement before the break is reached during playback of the main content.

13. The method of claim 1, further comprising:
receiving a request for the supplemental content for the supplemental content placement, wherein the platform should be selected for the supplemental content placement in a period of time until the break is reached.

14. The method of claim 1, further comprising:
training a set of prediction networks for a plurality of platforms based on historical information from the plurality of platforms; and
using the set of prediction networks to generate the information for the first value based on the context for each of the plurality of platforms.

15. The method of claim 1, wherein the context is for a user account that is associated with the request.

16. The method of claim 1, wherein the threshold is submitted to the platform when supplemental content with a pre-agreed upon second value is not found for the supplemental content placement.

17. A non-transitory computer-readable storage medium containing instructions, that when executed, control a computer system to be operable for:
receiving a supplemental content placement and a context associated with a request for supplemental content to be displayed for the supplemental content placement during a break that is encountered while main content is being played;
generating information to predict a first value that will be assigned by a platform based on the context using a prediction network that is trained to predict the first value using data specific to the platform, wherein the first value represents a value of submitting a bid for the supplemental content placement;
determining probabilities for a plurality of types of request actions based on the context, wherein different request actions comprise different bidding strategies that are used to determine the first value of the bid;
calculating a threshold for the supplemental content placement based on the first value and the probabilities for the plurality of types of request actions; and
submitting the threshold to the platform in a request for the platform to submit a bid for the supplemental content placement, wherein the threshold should be met by the bid to be accepted for the supplemental content placement, and wherein a second value is received for the bid from the platform and used to determine whether the platform is selected for the supplemental content placement during the break.

18. The non-transitory computer-readable storage medium of claim 17, further operable for:
submitting the threshold in a request to a plurality of platform to submit a second value for the supplemental content placement;
receiving a plurality of second values from at least a portion of the plurality of platforms; and
selecting one of the plurality of second values.

19. The non-transitory computer-readable storage medium of claim 17, wherein determining the probabilities comprises:
determining the plurality of types of request actions that may be used, wherein a first type of bidding strategy uses the threshold to generate the second value and a second type of bidding strategy does not use the threshold to generate the second value; and
assigning a first probability to the first type of bidding strategy and a second probability to the second type of bidding strategy.

20. An apparatus comprising:
one or more computer processors; and
a non-transitory computer-readable storage medium comprising instructions, that when executed, control the one or more computer processors to be operable for:
receiving a supplemental content placement and a context associated with a request for supplemental content to be displayed for the supplemental content placement during a break that is encountered while main content is being played;
generating information to predict a first value that will be assigned by a platform based on the context using a prediction network that is trained to predict the first value using data specific to the platform, wherein the first value represents a value of submitting a bid for the supplemental content placement;
determining probabilities for a plurality of types of request actions based on the context, wherein different request actions comprise different bidding strategies that are used to determine the first value of the bid;
calculating a threshold for the supplemental content placement based on the first value and the probabilities for the plurality of types of request actions; and
submitting the threshold to the platform in a request for the platform to submit a bid for the supplemental content placement, wherein the threshold should be met by the bid to be accepted for the supplemental content placement, and wherein a second value is received for the bid from the platform and used to determine whether the platform is selected for the supplemental content placement during the break.

* * * * *